United States Patent
Runyan et al.

(10) Patent No.: US 10,525,807 B1
(45) Date of Patent: Jan. 7, 2020

(54) SNAP-FIT DEFLECTOR SYSTEM

(71) Applicant: AISIN TECHNICAL CENTER OF AMERICA, INC., Northville, MI (US)

(72) Inventors: Joel Runyan, Canton, MI (US); Jacob Grimaldo, Garden City, MI (US); Chanli Ke, Novi, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 8 days.

(21) Appl. No.: 16/032,595

(22) Filed: Jul. 11, 2018

(51) Int. Cl.
*B60J 7/22* (2006.01)

(52) U.S. Cl.
CPC ........................ *B60J 7/22* (2013.01)

(58) Field of Classification Search
CPC .......................................... B60J 7/22
USPC ........................................... 296/217
See application file for complete search history.

(56) References Cited

U.S. PATENT DOCUMENTS

| | | | |
|---|---|---|---|
| 3,311,406 A * | 3/1967 | Fritsch | B60J 7/226 296/217 |
| 7,234,767 B2 | 6/2007 | Boss et al. | |
| 8,403,407 B2 | 3/2013 | Fukami et al. | |
| 8,562,071 B2 | 10/2013 | Hirata et al. | |
| 9,004,584 B1 | 4/2015 | Cadena | |
| 9,290,085 B2 | 3/2016 | Sawada et al. | |
| 9,440,521 B2 | 9/2016 | Konishi et al. | |
| 9,873,314 B1 | 1/2018 | Grimaldo et al. | |
| 2010/0327624 A1 * | 12/2010 | Wetzels | B60J 7/22 296/180.1 |
| 2013/0249255 A1 * | 9/2013 | Sawada | B60J 7/22 296/217 |
| 2014/0159435 A1 * | 6/2014 | Vogel | B60J 7/22 296/217 |
| 2014/0319882 A1 * | 10/2014 | Farber | B60J 7/0046 296/217 |
| 2018/0208035 A1 * | 7/2018 | Wimmer | B29C 39/10 |

* cited by examiner

*Primary Examiner* — Jason S Morrow
(74) *Attorney, Agent, or Firm* — Oblon, McClelland, Maier & Neustadt, L.L.P.

(57) ABSTRACT

An articulable sunroof wind deflector system for a vehicle an upper member, a mesh portion affixed on a first side to the upper member, a lower member affixed to a second side of the mesh portion, the lower member having, a member front portion, a pair of arms that protrudes from the member front portion, and a housing affixed to the vehicle, the housing having a housing front portion to receive the member front portion, and a pair of shoulder to receive the pair of arms, wherein the pair of arms can slide and rotate around the pair of shoulders to guide the member front portion onto the housing front portion.

13 Claims, 7 Drawing Sheets

SNAP-FIT DEFLECTOR SYSTEM

BACKGROUND

Field of the Disclosure

The present disclosure relates to an articulable sunroof wind deflector system.

Description of the Related Art

In today's automotive industry sunroof systems for vehicles may rely on numerous parts and complex interactions between this parts that can require dexterity and time to be assembled on a vehicle.

For example, assembling a conventional sunroof wind deflector may require additional components (such as screws or clips), or require parts to be bent and distorted which may lead to involuntary breaking and/or damaging and may consume time in assembly lines increasing production costs.

Thus, a sunroof wind deflector system that can be easily assembled without bending and/or distortion in a mistake proof way is desired.

SUMMARY

Accordingly, the object of the present disclosure is to provide an articulable sunroof wind deflector system which overcomes the above-mentioned limitations.

In one non-limiting illustrative example, an articulable sunroof wind deflector system for a vehicle is presented. The articulable sunroof wind deflector system includes an upper member, a mesh portion affixed on a first side to the upper member, a lower member affixed to a second side of the mesh portion, the lower member having a member front portion, a pair of arms that protrudes from the member front portion, and a plurality of male clip portions along the member front portion and a housing affixed to the vehicle, the housing having a housing front portion to receive the member front portion, a pair of shoulder to receive the pair of arms, and a plurality of female clip portions to receive the plurality of male clip portions, wherein the pair of arms can slide and rotate around the pair of shoulders to guide the plurality of male clip portions into the plurality of female clip portions and affix the lower member onto the housing.

In one non-limiting illustrative example, an articulable sunroof wind deflector system for a vehicle is presented. The articulable sunroof wind deflector system includes an upper member, a mesh portion affixed on a first side to the upper member, a lower member affixed to a second side of the mesh portion, the lower member having, a member front portion, a pair of arms that protrudes from the member front portion, and a housing affixed to the vehicle, the housing having a housing front portion to receive the member front portion, and a pair of shoulder to receive the pair of arms, wherein the pair of arms can slide and rotate around the pair of shoulders to guide the member front portion onto the housing front portion.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
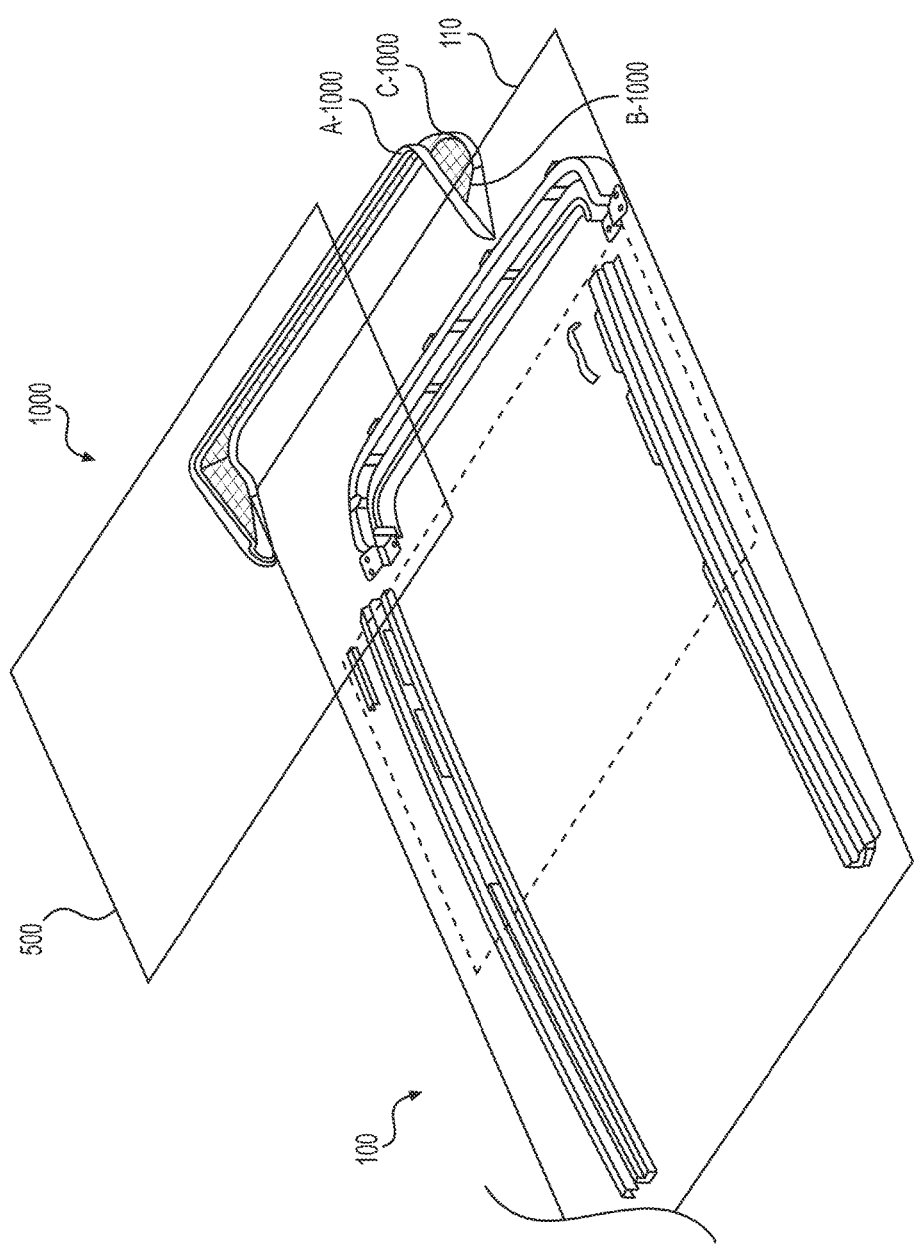
FIG. 1 is a perspective exploited view of an articulable sunroof wind deflector system of a vehicle, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIG. 1 is a perspective exploded view of an articulable sunroof wind deflector system of a vehicle, according to certain aspects of the disclosure.

The articulable sunroof wind deflector assembly 1000 may include a housing D-1000 affixed to an opening 110 of a vehicle 100, a lower member C-1000 insertable and affixable to the housing D-1000, a upper member A-1000 extending above the opening 110 of the vehicle 100 articulably affixed to the lower member C-1000 by means of a mesh portion B-1000 extending between the lower member C-1000 and the upper member A-1000.

The articulable sunroof wind deflector assembly 1000 is articulable between a closed state and an open state.

In the closed state, the glass panel 500 may completely cover the opening 110 and the upper member A-1000 and the lower member C-1000 are substantially adjacent to each other and compress the mesh portion B-1000.

In the open state, the glass panel 500 may be retracted or at least partially open the opening 110 and the upper member A-1000 and the lower member C-1000 are distant from each other with the mesh portion B-1000 stretched between the lower member C-1000 and the upper member A-1000.

The articulable sunroof wind deflector assembly 1000 provides an ergonomic, rapid, and convenient way to affix the lower member C-1000 to the housing D-1000 without the need for additional components while still preventing parts from being bended and/or distorted by relying on articulations between the lower member C-1000 and the housing D-1000.

As used herein, the term "top" and "upper" refers to the region of the articulable sunroof wind deflector system 1000 closest to the glass panel 500, while the term "bottom" and "lower" refer to the region of the articulable sunroof wind deflector system 1000 farthest from the glass panel 500.

Figure 2:
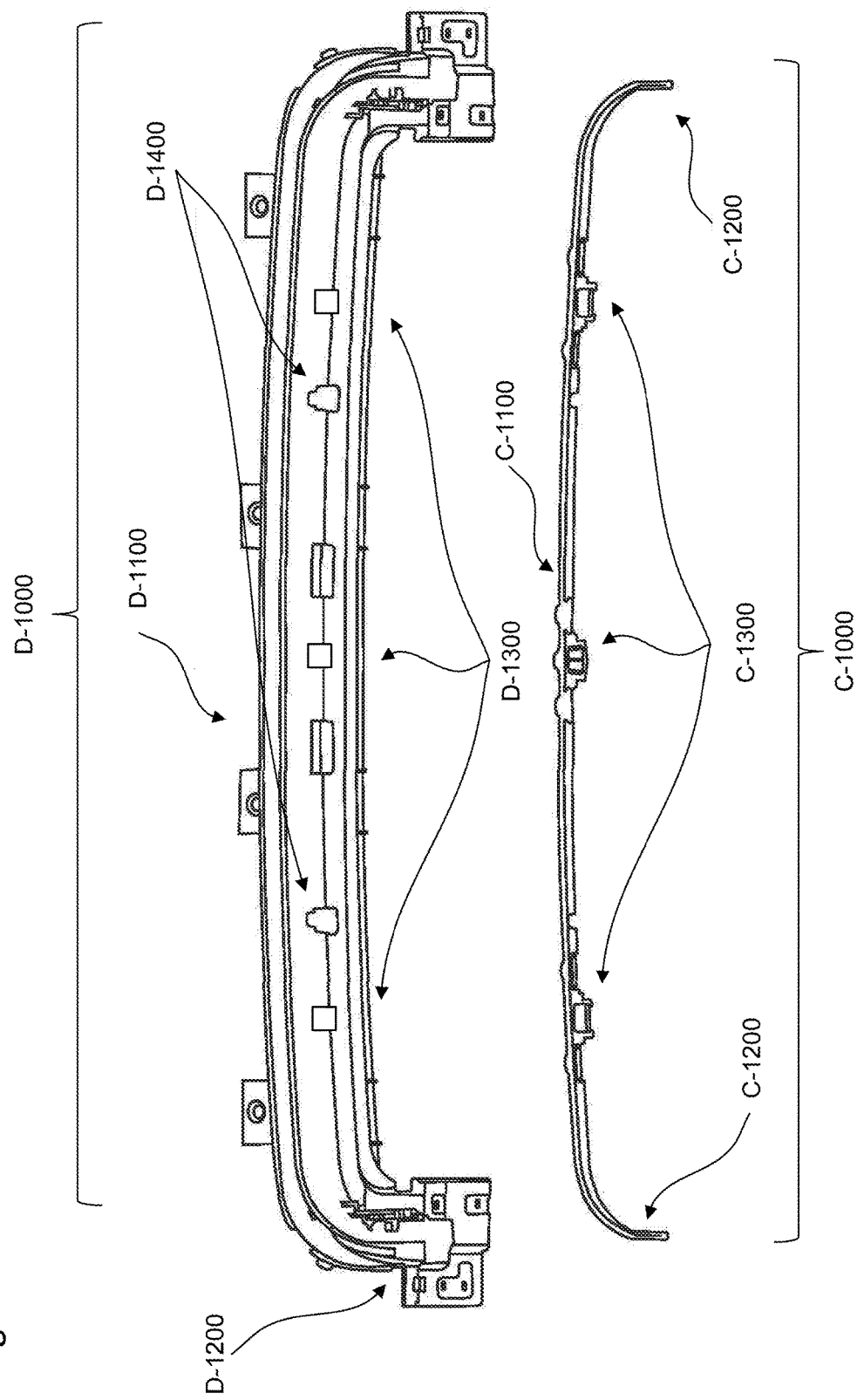
FIG. 2 is a perspective view of a lower member of the articulable sunroof wind deflector system and a housing of the articulable sunroof wind deflector system, according to certain aspects of the disclosure.

FIG. 2 is a perspective view of a lower member C-1000 of the articulable sunroof wind deflector system and a housing of the articulable sunroof wind deflector system, according to certain aspects of the disclosure.

The lower member C-1000 can include a member front portion C-1100, a pair of arms C-1200 that protrudes from terminal portions of the member front portion C-1100, and a plurality of male clip portions C-1300 positioned along the member front portion C-1100 between the pair of arms C-1200.

The housing D-1000 can include a housing front portion D-1100, a pair of shoulders D-1200 that protrudes from terminal portions of the housing front portion D-1100, and a plurality of female clip portions D-1300 positioned along the housing front portion D-1100 between the pair of shoulders D-1200.

The pair of arms C-1200 can slide on the pair of shoulders D-1200 and rotate around the pair of shoulders D-1200 to guide the member front portion C-1100 onto the housing front portion D-1100 and have the plurality of male clip portions C-1300 inserted into the plurality of female clip portions D-1300.

FIGS. 3A-3D are perspective views of the lower member C-1000 completely inserted in the housing D-1000, the lower member C-1000 partially inserted into a shoulder D-1200 of the housing D-1000, the arm C-1200 of the lower member C-1000 fully inserted into the shoulder D-1200 of the housing D-1000, and a male clip portion C-1300 of the lower member C-1000 inserted into a female clip portions D-1300 of the housing D-1000, according to certain aspects of the disclosure.

Each arm of the pair of arms C-1200 of the lower member C-1000 can include a lower jaw C-1210, an upper jaw C-1220 that faces the lower jaw C-1210, and a key hole C-1230 delimited by the lower jaw C-1210 and the upper jaw C-1220.

The key hole C-1230 can include a circular opening C-1232 and a base opening C-1234 that connects the circular opening C-1232 to an external environment.

Each shoulder of the pair of shoulders D-1200 of the housing D-1000 can include a lower pad D-1210, an upper pad D-1220 that faces the lower pad D-1210, and reinforcement wall D-1230 that extends between the lower pad D-1210 and the upper pad D-1220.

The upper jaw C-1220 and the lower jaw C-1220 can slide along the shoulder D-1200 through the base opening C-1234 to have upper pad D-1220 in contact with the circular opening C-1232 and the lower pad D-1210 to face the base opening C-1234. The upper jaw C-1220 and the lower jaw C-1210 can rotate around the shoulder D-1200 with the circular opening C-1232 rotating around the upper pad D-1220 and lower pad D-1210 towards the housing D-1000. The rotation of the upper jaw C-1220 and the lower jaw C-1210 around the shoulder D-1200 guide the lower member C-1000 and allow the plurality of male clip portions C-1300 of the lower member C-1000 to face the plurality of female clip portions D-1300 of the housing D-1000.

Each male clip portion of the plurality of male clip portion C-1300 can include a pair of shanks C-1310 that protrudes substantially normally from the member front portion C-1100, and a pair of barbs C-1320 that terminates the pair of shanks C-1310.

Each female clip portion of the plurality of female clip portions D-1300 can include a tongue D-1310 that protrudes substantially normally from the housing front portion D-1100 to be inserted between the pair of barbs C-1320 and affix the lower member C-1000 to the housing D-1000 when the plurality of male clip portions C-1300 is engaged into the plurality of female clip portions D-1300.

In addition, the housing D-1000 can include a plurality of wedges D-1400 that protrudes from the housing front portion D-1100 and contact the member front portion C-1100 to provide support to the lower member C-1000, as illustrated in FIG. 2.

Figure 4:
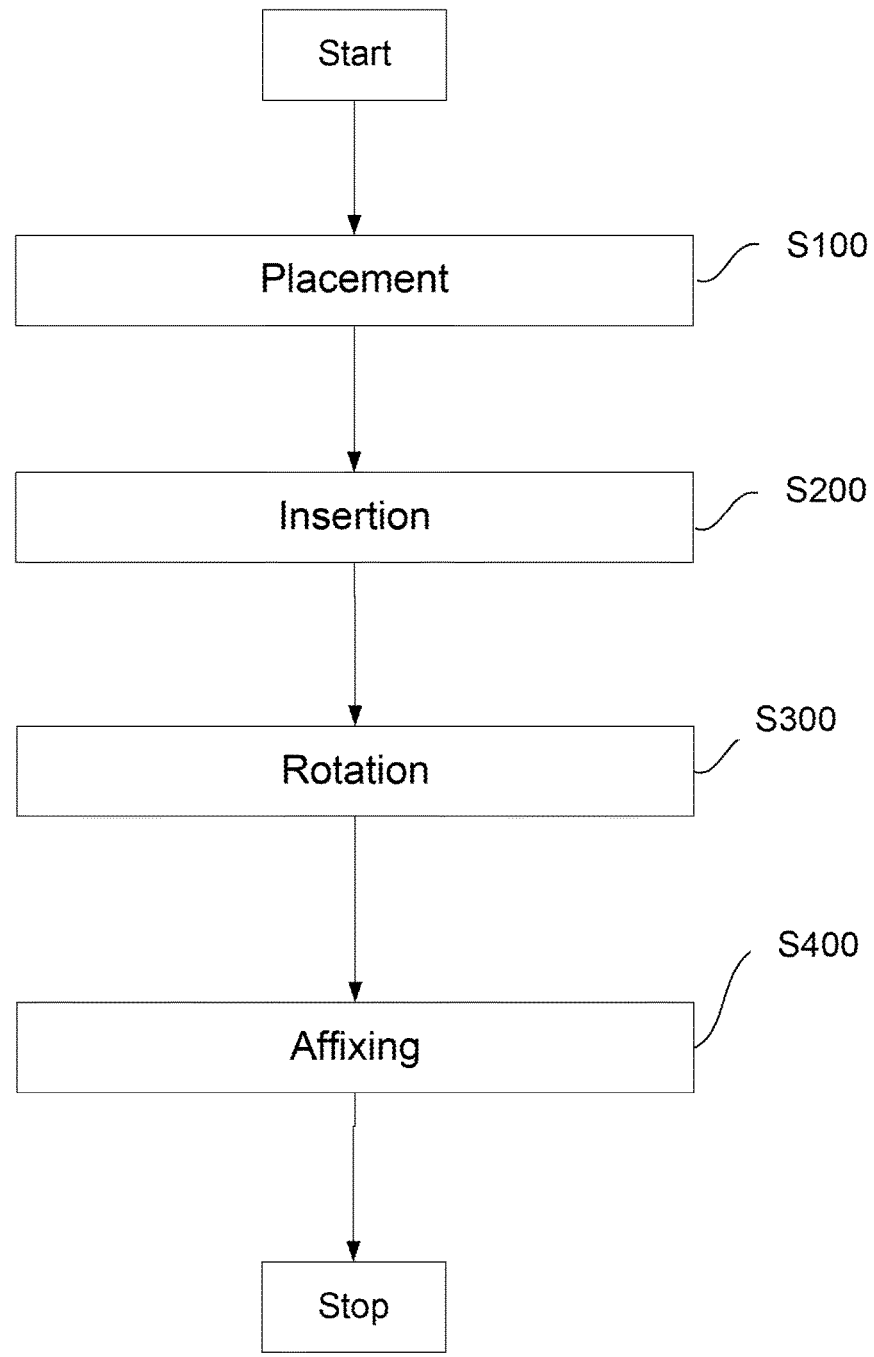
FIG. 4 is a chart flow of a method for inserting the lower member into the housing, according to certain aspects of the disclosure.

FIG. 4 is a chart flow of a method for inserting the lower member C-1000 into the housing D-1000, according to certain aspects of the disclosure.

Figure 3A:
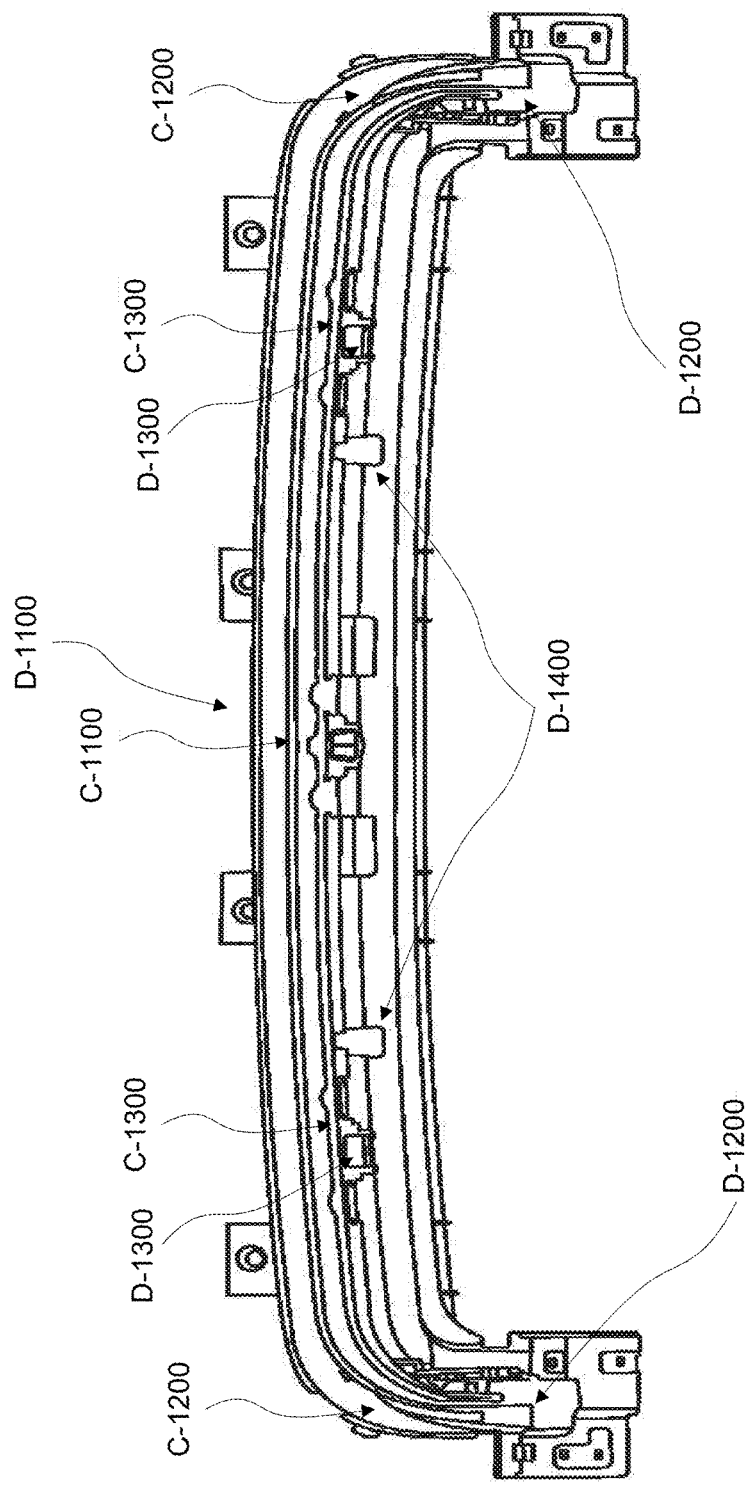
FIG. 3A is a perspective view of the lower member inserted in the housing, according to certain aspects of the disclosure.
Figure 3B:
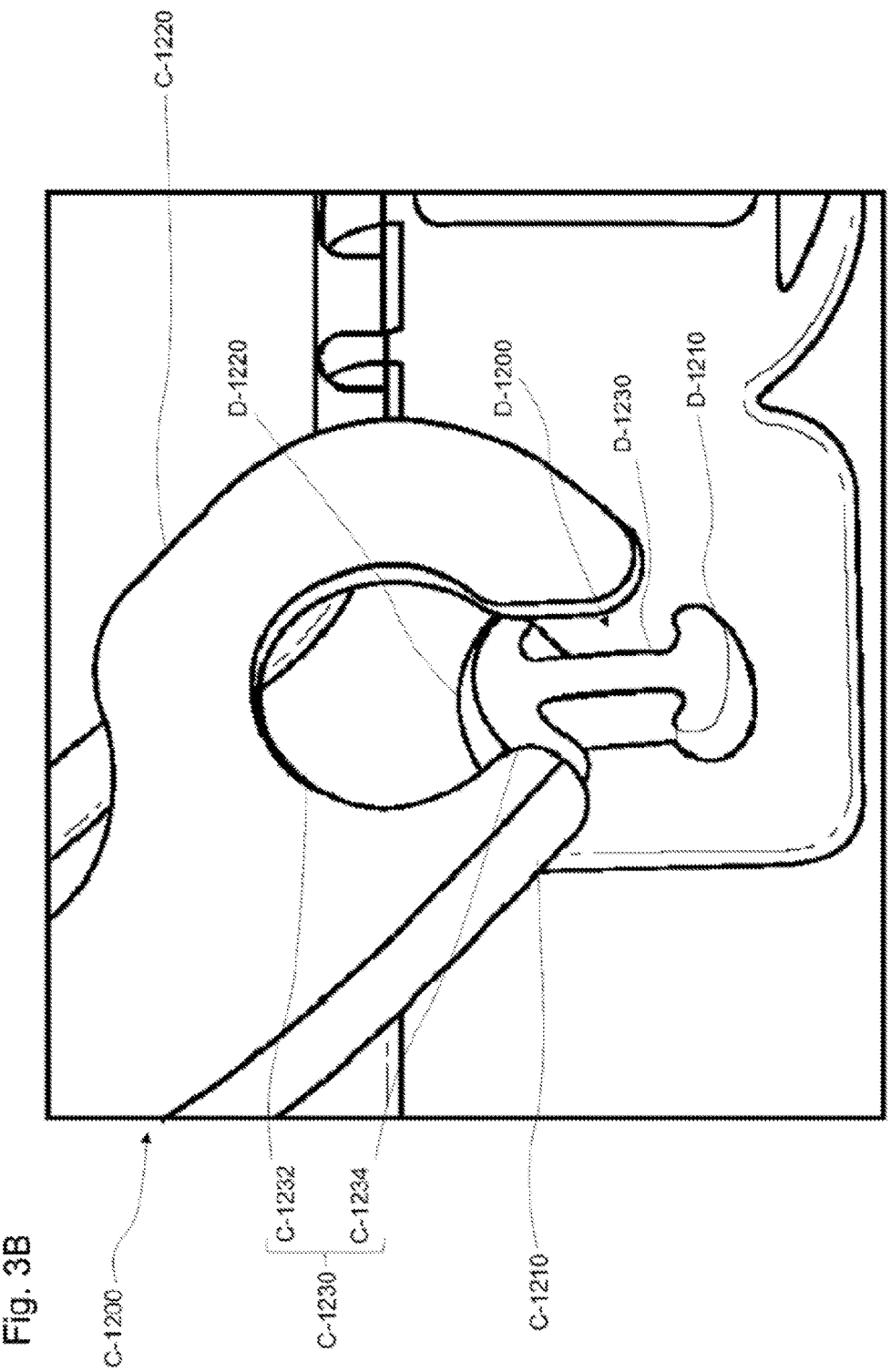
FIG. 3B is a perspective view of an arm of the lower member partially inserted into a shoulder of the housing, according to certain aspects of the disclosure.

In a step S100, the pair of arms C-1200 is placed on top of the pair of shoulders D-1200 with the base opening C-1234 facing the upper pad D-1220, as illustrated in FIG. 3B.

Figure 3C:
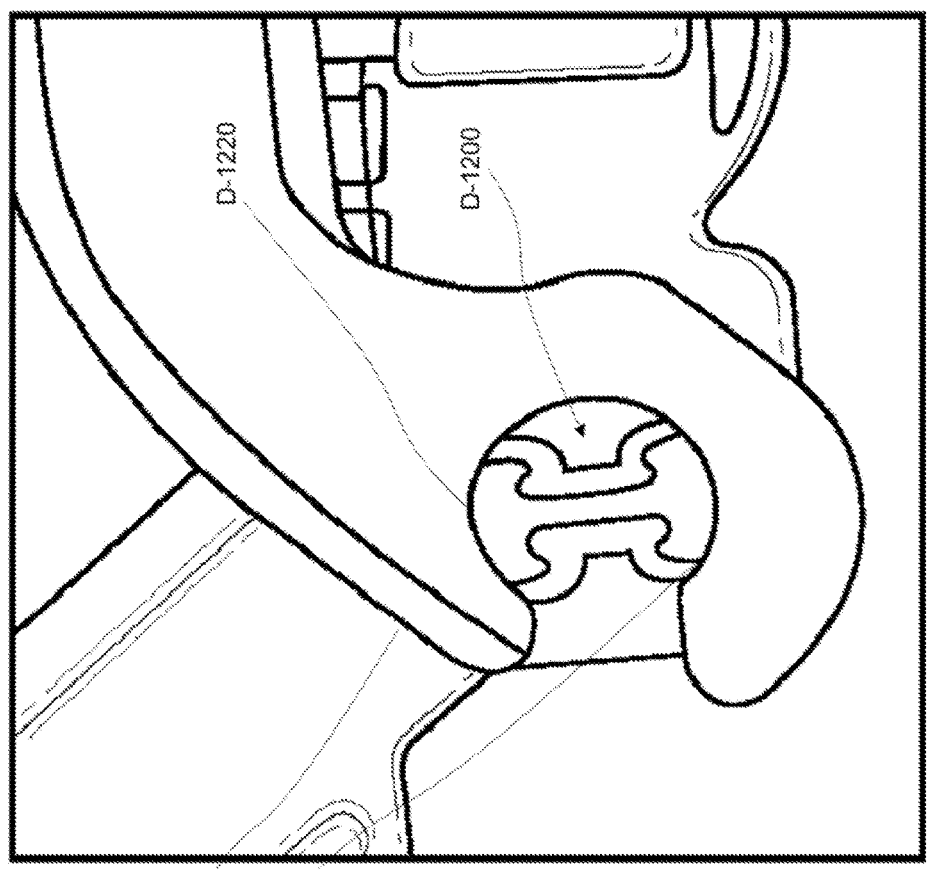
FIG. 3C is a perspective view of the arm of the lower member fully inserted into the shoulder of the housing, according to certain aspects of the disclosure.
Figure 3D:
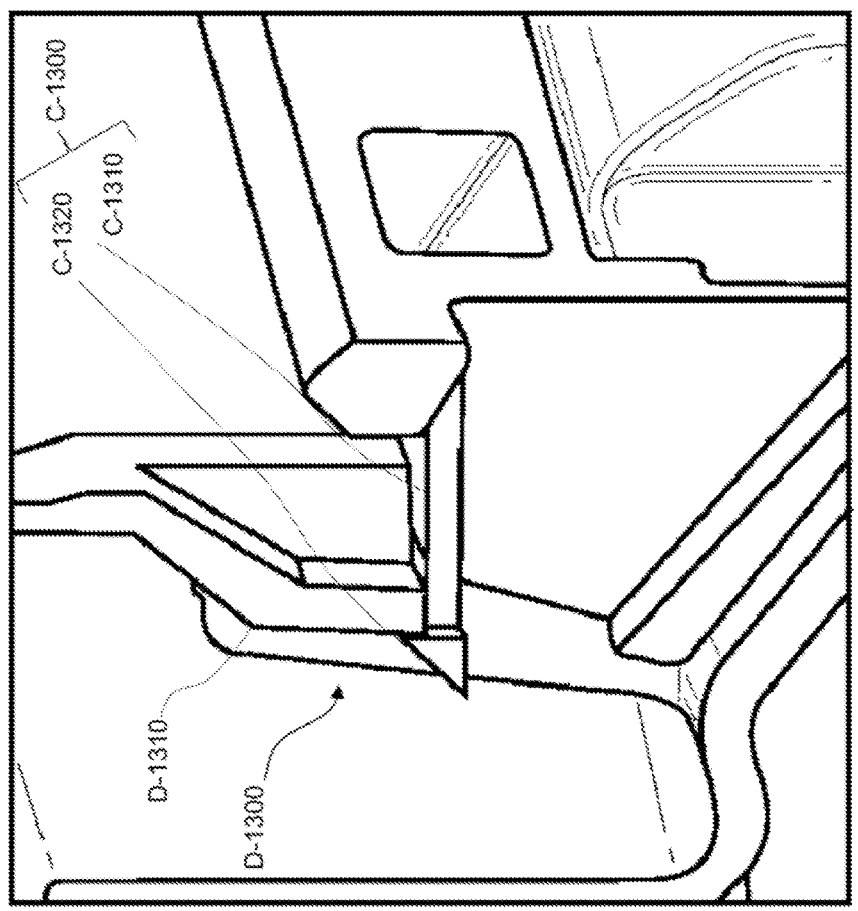
FIG. 3D is a perspective view of a male clip portion of the lower member inserted into a female clip portion of the housing, according to certain aspects of the disclosure.

In a step S200, the pair of arms C-1200 is inserted around the pair of shoulders D-1200 by pushing the pair of arms C-1200 downwardly to have the upper jaw C-1220 and the lower jaw C-1210 sliding along the pair of shoulders D-1200 until the upper pad D-1220 contacts the circular opening C-1232, as illustrated in FIG. 3C.

In a step S300, the lower member C-1000 is rotated towards the housing D-1000 to have the circular opening C-1232 rotating around the upper pad D-1220 and the lower pad D-1210 until the plurality of male clip portions C-1300 contacts and engages the plurality of female clip portions D-1300.

In a step S400, the lower member C-1000 is affixed to the housing D-1000 by inserted the plurality of male clip portions C-1300 into the plurality of female clip portions D-1300 until the pair of barbs C-1320 passes around the tongue D-1310 and hold the tongue D-1310 against the member front portion C-1100.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. An articulable sunroof wind deflector system for a vehicle, comprising:
   an upper member;
   a mesh portion affixed on a first side to the upper member;
   a lower member affixed to a second side of the mesh portion, the lower member including
   a member front portion,
   a pair of arms that protrudes from the member front portion, and
   a plurality of male clip portions along the member front portion; and
   a housing affixed to the vehicle, the housing including
   a housing front portion to receive the member front portion,
   a pair of shoulders to receive the pair of arms, and a plurality of female clip portions to receive the plurality of male clip portions, wherein the pair of arms slide and rotate around the pair of shoulders to guide the plurality of male clip portions into the plurality of female clip portions and affix the lower member onto the housing.

2. The articulable sunroof wind system of claim 1, wherein each arm of the pair of arms includes an upper jaw and a lower jaw that slide and rotate around each shoulder of the pair of shoulders.

3. The articulable sunroof wind system of claim 2, wherein the upper jaw and lower jaw include a rectangular opening to slide along the shoulder and a circular opening to rotate around the shoulder.

4. The articulable sunroof wind system of claim 1, wherein each shoulder of the pair of shoulders includes an upper pad and a lower pad that faces the upper pad.

5. The articulable sunroof wind system of claim 4, wherein the upper pad and the lower pad have a circular surface to provide rotation of the pair of arms.

6. The articulable sunroof wind system of claim 1, wherein each male clip portion of the plurality of male clip portions includes a barb to lock the member front portion onto the housing front member.

7. The articulable sunroof wind system of claim 6, wherein each female clip portion of the plurality of female clip portions includes a tongue to receive the barb and lock the member front portion onto the housing front member.

8. The articulable sunroof wind system of claim 1, wherein the housing front portion includes a plurality of wedges to provide support to the member front portion.

9. An articulable sunroof wind deflector system for a vehicle, comprising:
an upper member;
a mesh portion affixed on a first side to the upper member;
a lower member affixed to a second side of the mesh portion, the lower member including
a member front portion,
a pair of arms that protrudes from the member front portion; and
a housing affixed to the vehicle, the housing including
a housing front portion to receive the member front portion, and
a pair of shoulders to receive the pair of arms,
wherein the pair of arms can slide and rotate around the pair of shoulders to guide the member front portion onto the housing front portion.

10. The articulable sunroof wind system of claim 9, wherein each arm of the pair of arms includes an upper jaw and a lower jaw that slide and rotate around each shoulder of the pair of shoulders.

11. The articulable sunroof wind system of claim 10, wherein the upper jaw and lower jaw provide a rectangular opening to slide along the shoulder and a circular opening to rotate around the shoulder.

12. The articulable sunroof wind system of claim 9, wherein each shoulder of the pair of shoulders include an upper pad and a lower pad that faces the upper pad.

13. The articulable sunroof wind system of claim 12, wherein the upper pad and the lower pad have a circular surface to provide rotation of the pair of arms.

* * * * *